(12) United States Patent
Argue et al.

(10) Patent No.: US 9,373,109 B2
(45) Date of Patent: Jun. 21, 2016

(54) HELPING CUSTOMERS SELECT A CHECKOUT LANE WITH RELATIVE LOW CONGESTION

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 178 days.

(21) Appl. No.: 13/756,378

(22) Filed: Jan. 31, 2013

(65) Prior Publication Data

US 2014/0214573 A1 Jul. 31, 2014

(51) Int. Cl.
*G06Q 20/20* (2012.01)

(52) U.S. Cl.
CPC .............. *G06Q 20/20* (2013.01); *G06Q 20/202* (2013.01)

(58) Field of Classification Search
CPC ... G06Q 20/202; G06Q 20/20; G06Q 20/322; G06Q 20/40; G06Q 20/3278
USPC ......................................................... 705/21
See application file for complete search history.

(56) References Cited

U.S. PATENT DOCUMENTS

| | | | |
|---|---|---|---|
| 4,398,257 A | 8/1983 | Paganini | |
| 6,173,209 B1 | 1/2001 | Laval | |
| 6,590,507 B2 | 7/2003 | Burns | |
| 7,493,208 B1 | 2/2009 | Craine | |
| 7,508,321 B2 | 3/2009 | Gueziec | |
| 8,082,165 B2 | 12/2011 | Natsuyama | |
| 8,116,564 B2 | 2/2012 | Kilambi | |
| 8,510,163 B2 | 8/2013 | Hess | |
| 2005/0177423 A1 | 8/2005 | Swanson | |
| 2005/0273343 A1 | 12/2005 | Coleman | |
| 2005/0288856 A1 | 12/2005 | Uyeki | |
| 2006/0178943 A1 | 8/2006 | Rollinson | |
| 2007/0136118 A1 | 6/2007 | Gerlach | |
| 2007/0138268 A1 | 6/2007 | Tuchman | |
| 2008/0021632 A1 | 1/2008 | Amano | |

(Continued)

FOREIGN PATENT DOCUMENTS

WO    WO2013093780 A1    6/2013

OTHER PUBLICATIONS

Walmart testing 'Scan & Go' iPhone self-checkout app, cashiers becoming endangered species Weblog post. Engadget Mobile, Newstex. Aug. 31, 2012.*

*Primary Examiner* — Rayan Zeender
*Assistant Examiner* — Fawaad Haider
(74) *Attorney, Agent, or Firm* — Howard & Howard Attorneys PLLC

(57) ABSTRACT

The present invention extends to methods, systems, and computer program products for helping customers select lesser congested checkout lanes. A cashier can adjust a user-interface control to indicate customer congestion at his or her checkout lane. The indicated customer congestion is combined with indicated customer congestions for other checkout lanes (which may be more or less congested). The combined indicated customer congestions are used to form a lane congestion report for a physical store location. The lane congestion report can be sent to and presented at customer mobile devices at or near the physical store location. Customers can use the information presented in the lane congestion report to select a lesser congested checkout lane.

7 Claims, 4 Drawing Sheets

(56) References Cited

U.S. PATENT DOCUMENTS

| | | |
|---|---|---|
| 2008/0154720 A1 | 6/2008 | Gounares |
| 2008/0290182 A1* | 11/2008 | Bell et al. .................... 235/61 V |
| 2008/0319935 A1 | 12/2008 | Chandak |
| 2009/0076875 A1 | 3/2009 | Lert, Jr. |
| 2010/0151838 A1 | 6/2010 | Wormald |
| 2011/0225032 A1 | 9/2011 | Kobres |
| 2011/0246067 A1 | 10/2011 | Markham |
| 2012/0078673 A1 | 3/2012 | Koke |
| 2013/0103519 A1 | 4/2013 | Kountotsis |
| 2013/0103539 A1 | 4/2013 | Abraham |
| 2013/0223678 A1 | 8/2013 | Brunetti |
| 2013/0273938 A1* | 10/2013 | Ng et al. .................... 455/456.1 |
| 2014/0046789 A1* | 2/2014 | Baliga .......................... 705/26.1 |
| 2014/0079282 A1* | 3/2014 | Marcheselli et al. ......... 382/103 |

* cited by examiner

HELPING CUSTOMERS SELECT A CHECKOUT LANE WITH RELATIVE LOW CONGESTION

CROSS-REFERENCE TO RELATED APPLICATIONS

Not applicable.

BACKGROUND

1. Field of the Invention

This invention relates generally to the field of sales transactions, and, more particularly, to helping customers select lesser congested checkout lanes.

2. Related Art

In virtually all physical store locations, customers check out at a checkout lane. Checkout lanes typically include a Point-of-Sale (POS) system, having various input devices (e.g., keyboard, card reader, barcode scanner, etc.) and various output devices (e.g., cashier and/or customer facing displays, receipt printer, etc.). Checkout lanes can include a cashier (a store employee) or can be self-service.

Depending on the size of a store, the number of checkout lanes can range from one to many dozen. As the number of checkout lanes increases (and span greater physical distances), it can be difficult for a customer to identify a checkout lane with the shortest wait time for checking out. A customer can walk by various different checkout lanes visually inspecting the checkout lanes (e.g., number of customers in line, number of items customers have for purchase, etc.) to determine which checkout lane might provide the quickest checkout. However, by the time a customer considers various different checkout lanes, the wait time at one or more of the various different checkout lanes can change. For example, right after a customer walks by a checkout lane, another customer with a large number of items may queue up at the checkout lane. On the other hand, a number of customers in a checkout lane may pay cash and have close to exact change, freeing up the checkout lane more quickly than expected.

In many, if not all, store environments customers have no way to tell, other than from their own observations, how fast a checkout lane might be. Thus, customers are typically relegated to making a best guess based on their own observations when initially selecting a checkout lane. Further, even after a checkout lane is initially selected, a customer has no assurances that the selected checkout was or continues to remain a good choice. Thus, customers typically continue to watch other checkout lanes to see if they were or have become a better choice. Guessing the correct checkout lane can be a source of anxiety for customers. Checkout lane selection can also lead some customers to become angry. Either of these outcomes can have a negative impact on customer experience.

BRIEF DESCRIPTION OF THE DRAWINGS

The specific features, aspects and advantages of the present invention will become better understood with regard to the following description and accompanying drawings where.

DETAILED DESCRIPTION

Figure 1:
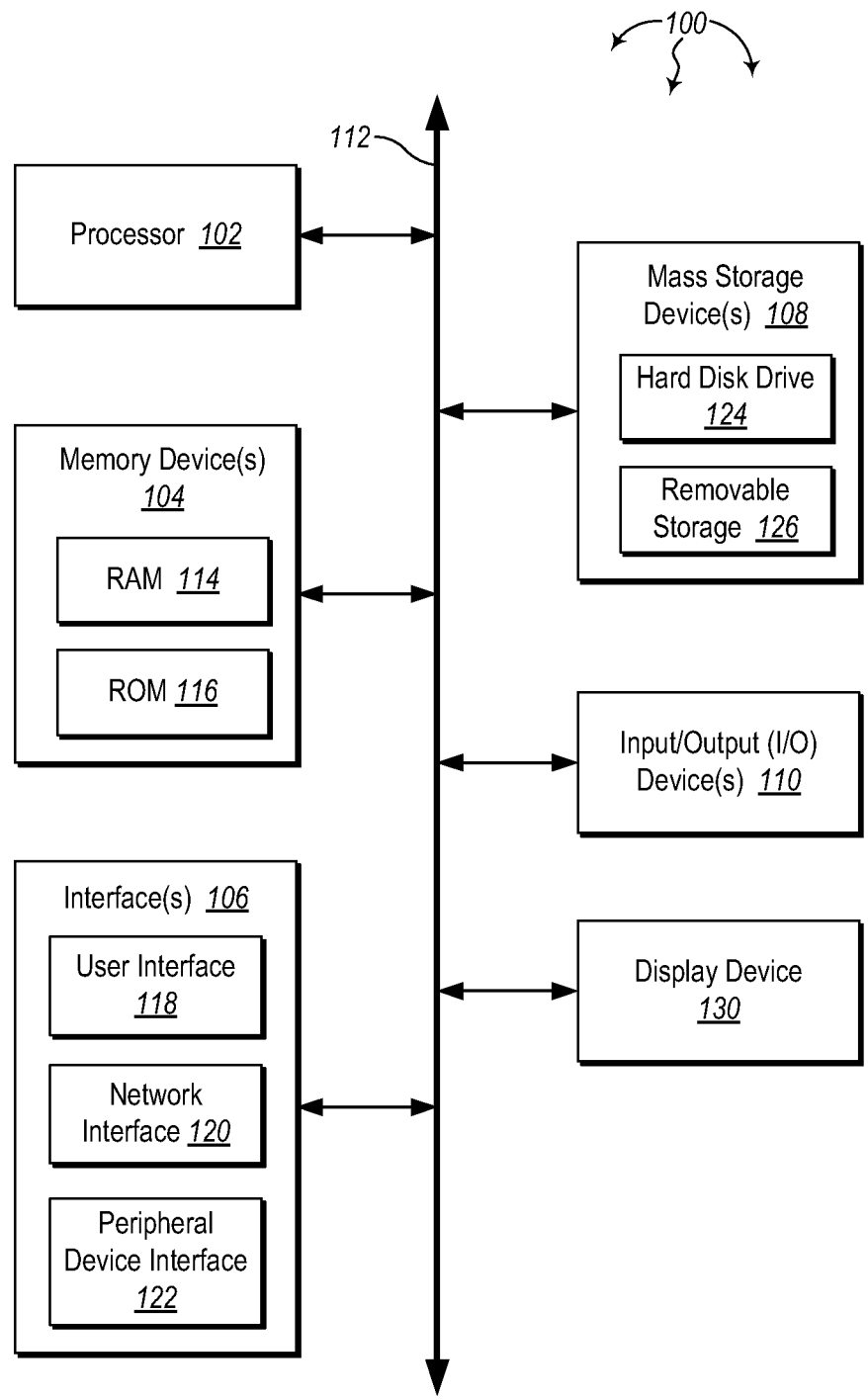
FIG. 1 illustrates an example block diagram of a computing device.

The present invention extends to methods, systems, and computer program products for helping customers select checkout lanes with relative low congestion.

In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

A physical store location includes one or more checkout lanes. Each checkout lane includes a checkout lane (e.g., a Point-Of-Sale (POS)) computer. In general, a congestion processing computer (or even a POS controller) can detect when each checkout lane is open or closed. Each checkout lane computer can also display a user-interface control, such as, for example, a slider or a dial, on a display device. The user-interface control is used to indicate congestion at the checkout lane. A cashier at a checkout lane (e.g., that is using the POS computer to check out customers) can adjust the user-interface control to indicate a current congestion level at the checkout lane. The user-interface control can remain displayed on the display device as customers are checked out. The user-interface control can be easily accessible and adjustable such that a cashier can adjust the user-interface control quickly and/or while performing checkout duties. A store can mandate or otherwise require checkout operators to update indicated congestion at a checkout lane from time to time or at specified intervals.

In some embodiments, checkout lane congestion is represented using a numeric scale from zero to ten. Thus, as congestion at a checkout lane changes, a cashier can adjust the user-interface control to a number indicative of the current lane congestion. Lower numbers can indicate lesser congestion (fewer customers and/or customers with fewer items) and higher numbers can indicate greater congestion (more customers and/or customers with more items).

At specific intervals or in response to indicated changes in checkout lane congestion, each of the one or more checkout lane computers can send congestion data (e.g., a number indicative of congestion) to a congestion processing computer. The congestion processing computer can receive congestion data from the one or more checkout lane computers. Upon receiving congestion data, the congestion processing computer can update a lane congestion report. When congestion data for a checkout lane is not updated in a specified period of time, the congestion processing computer can view congestion for the checkout lane as "unknown". The lane congestion report indicates congestion at each of the one or more checkout lanes.

The congestion processing computer can establish wireless network connections with one or more mobile devices in or near the physical store location (e.g., within range of wireless access points at the physical store location). The congestion processing computer can provide lane congestion reports to the one or more mobile devices over the established wireless connections.

Using an application or "app" on the mobile device, a user can request a lane congestion report for the physical store location. The request can be sent over an established wireless network connection to the congestion processing computer. The congestion processor computer can receive the request from the mobile device over the established wireless connection. In response to receiving the request, the congestion processing computer can send a lane congestion report back to the mobile device. The mobile device application can include a user-interface for displaying the lane congestion report on a display at the mobile device. For each checkout lane in a store, the lane congestion report can indicate if the checkout lane is open or closed. For open checkout lanes, the lane congestion report can also indicate relative congestion (if known) at the checkout lane. When relative congestion for an open checkout lane is not known, the lane congestion report can indicate that lane congestion for the checkout lane is "unknown".

Displaying the lane congestion report makes the user aware of one or more open checkout lanes as well as the relative congestion at each of the one or more open checkout lanes in the physical store location. The user can refer to the lane congestion report at or near the time he or she is ready to checkout. Accordingly, the lane congestion report can remove a significant amount of uncertainty associated with checkout lane selection.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
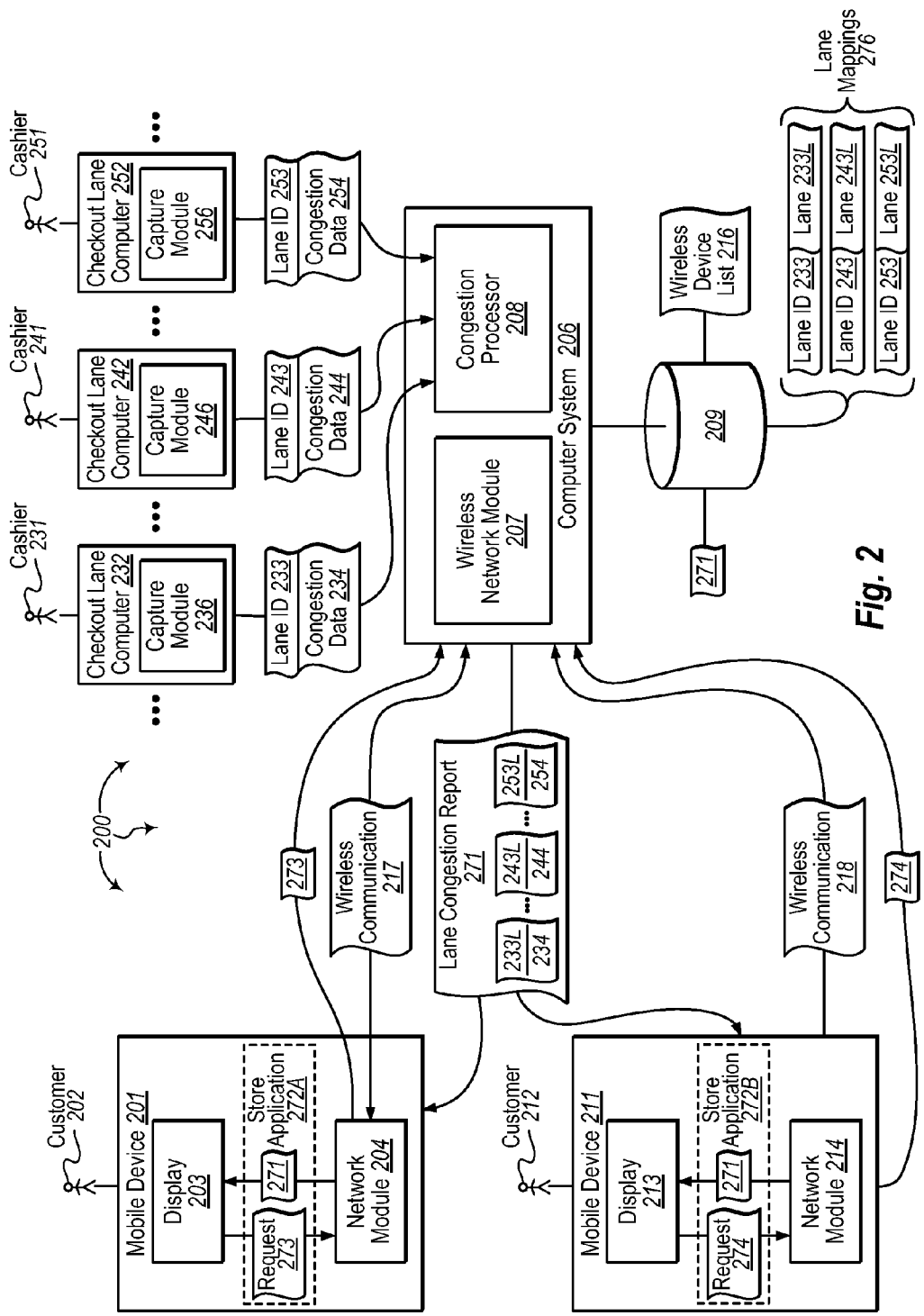
FIG. 2 illustrates an example computer architecture that facilitates helping customers select a checkout lane with relative low congestion within a physical store location.

FIG. 2 illustrates an example computer architecture 200 that facilitates helping customers select lesser congested checkout lanes within a physical store location. Referring to FIG. 2, computer architecture 200 includes mobile device 201, mobile device 211, computer system 206 and checkout lane computers 232, 242, and 252. Each of the depicted devices and computers can be connected to one another over (or be part of) a network, such as, for example, a PAN, a LAN, a WAN, and even the Internet. Accordingly, each of the depicted devices and computer systems as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Each of checkout lane computers 232, 242, and 252 can be Point-of-Sale (POS) computer systems at corresponding checkout lanes (or isles) in a physical store location. The ellipses before, between, and after checkout lane computers 232, 242, and 252 represent that other checkout lane computers can be at other checkout lanes in the physical store location. The physical store location may be owned by an entity, such as, for example, a retailer corporation that runs a chain of stores. The chain of stores can include one or more of: grocery stores, department stores, warehouse stores, discount stores, etc.

Each of checkout lane computers 232, 242, and 252 can include a transaction processor, a communication module, and I/O peripherals. Generally, a transaction processor is configured to manage sales transactions for a checkout lane computer. The transaction processor can receive input from I/O peripherals to open a sales transaction, collect receipt data (e.g., date, time, item, number of units, cost data, tax, department, payment method, etc.) for a sales transaction, and close a sales transaction. I/O peripherals can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., cashier-facing display or monitor, customer-facing display or monitor, receipt printer, etc.). The communication module can be a wired and/or wireless network adapter for connecting the checkout lane computer with a network, such as, for example, a Wi-Fi and/or wired Ethernet network, and that may facilitate a further connection to Wide Area Networks (e.g., the Internet).

As depicted, checkout lane computers 232, 242, and 252 include capture modules 236, 246, and 256 respectively. Each of capture modules 236, 246, and 256 can send a message to computer system 208 indicating when corresponding checkout lanes 232, 242, and 252 are open. Each of capture modules 236, 246, and 256 are also configured to capture indicated lane congestion for a corresponding checkout lane. Each of capture modules 236, 246, and 256 can display a user-interface control at a cashier-facing display or monitor for indicating lane congestion. The user-interface control can be a dial or slider that is easily accessible and adjustable. The user-interface control can also remain displayed on the display device as customers are checked out. Accordingly, a cashier can adjust the user-interface control efficiently and/or while performing checkout duties.

A cashier can adjust the user-interface control to indicate congestion at a checkout lane. Any of capture modules 236, 246, and 256 can capture an indicated congestion. For example, cashiers 234, 241, and 251 can adjust user-interface controls at checkout lane computers 232, 242, and 252 respectively to indicate congestion levels at corresponding checkout lanes. Capture modules 236, 246, and 256 can capture the indicated congestion levels at the corresponding checkout lanes.

When congestion at a checkout lane decreases (fewer customers and/or customers with fewer items), the cashier can adjust the user-interface control to indicate the decreased congestion. On the other hand, when congestion at a checkout lane increases (more customers and/or customers with more items), the cashier can adjust the user-interface control to indicate the increased congestion.

In some embodiments, lane congestion is indicated on a numeric scale, such as, for example, from zero (less congested) to ten (more congested). The user-interface control can be adjustable to any number within the numeric range. The user-interface control can be adjustable between discrete positions for integer values, for example, 0, 1, 2, 3, 4, 5, 6, 8, 9, 10. Alternately, the user-interface control can be adjustable to any value within the number range, for example, 2.87, 4.23, 9.5, 6.75, etc.

In other embodiments, lane congestion can be indicated using a enumerated list of options, such as, for example, "no congestion", "light congestion" moderate congestion", and "heavy congestion". The user-interface control can be adjustable to any of the enumerated operations. Any number of other techniques for quantifying lane congestion is also possible.

Upon capturing an indicated congestion, a capture module can formulate congestion data. For example, a capture module can associate a capture time with a captured indicated congestion. In some embodiments, a capture module is also configured to capture operational data, such as, that a corresponding checkout lane is open, component malfunctions (e.g., card reader down), level of consumables (e.g., paper in receipt printer, etc., about a corresponding checkout lane computer. Operational data can be used to create additional status messages that may be useful to a customer. Any captured operational data can also be included in congestion data.

As such, customers can be provided with additional information about checkout lane conditions. For example, even if an open checkout lane has low congestion, a customer paying by credit card may choose to avoid that checkout lane if the card reader is not operational.

A capture module can also associate a lane ID with formulated congestion data or an indication that a checkout lane is open. A lane ID identifies a checkout lane within a physical store location. For example, capture modules 236, 246, and 256 can associate lane IDs 233, 243, and 253 with congestion data 234, 244, and 254 respectively. Lane IDs 233, 243, and 253 can identify corresponding checkout lanes in the physical store location.

As depicted, computer system 206 includes wireless network module 207 and congestion processor 208. Congestion processor 208 is configured to receive lane IDs and corresponding congestion data from checkout lane computers within the physical store location. From the lane IDs and congestion data, congestion processor 208 can formulate a lane congestion report for the physical store location. The lane congestion report can indicate a relative congestion at each of the checkout lanes in the physical store location. Congestion processor 208 can refer to lane mappings 276 (stored in database 209) to match lane IDs to corresponding checkout lanes. Congestion processor 208 can maintain and update lane congestion reports stored in database 209.

Wireless network module 207 is configured to establish wireless network connections with mobile devices that are at or near the physical store location (e.g., within range of wireless access points). Mobile devices can send requests (register) for lane congestion reports to wireless network module 207. Wireless network module 207 can manage wireless device list 216, which includes any mobile devices that have requested lane congestion reports. When a mobile device requests lane congestion reports, wireless network module can list the mobile device in wireless device list 216 (stored in database 209). Subsequently, from time to time, or when new lane congestion reports become available, wireless network module 207 can send lane congestion reports to requesting mobile devices.

In some embodiments, wireless network module 207 receives an immediate request for a lane congestion report form a mobile device. In response, wireless network module 207 can, in essentially real-time, return a most recent lane congestion report to the requesting mobile device. The requesting mobile device may or may not already be included in wireless device list 216.

In general, mobile devices can include store application 272 (e.g., an "app") for establishing communications with computer system 206. Store application 272 can interoperate with a corresponding network module (e.g., network module 204 or 214) to establish a wireless network connection with wireless network module 207. A mobile device can request (register for) lane congestion reports from computer system 206 over the established wireless connection. Store application 272 can also interoperate with corresponding network modules to receive lane congestion reports. Received lane congestion reports can be presented through a user-interface at a corresponding display (e.g., display 203 or 213).

In some embodiments, a mobile device sends an immediate request for a lane congestion report to computer system 206. In response, the mobile device receives, in essentially real-time, a most recent lane congestion report form computer system 206.

Based on a lane congestion report, a customer (e.g., customer 202 or 212) can make a more informed decision when selecting checkout lanes at the physical store location. After a customer has selected a checkout lane, a lane congestion report may indicate that lane congestion is essentially the same as when the customer selected the checkout lane. Thus, the customer can feel more confident in their checkout lane selection. If congestion changes at one or more lanes, a lane congestion report can also assist a customer with switching checkout lanes.

Figure 3:
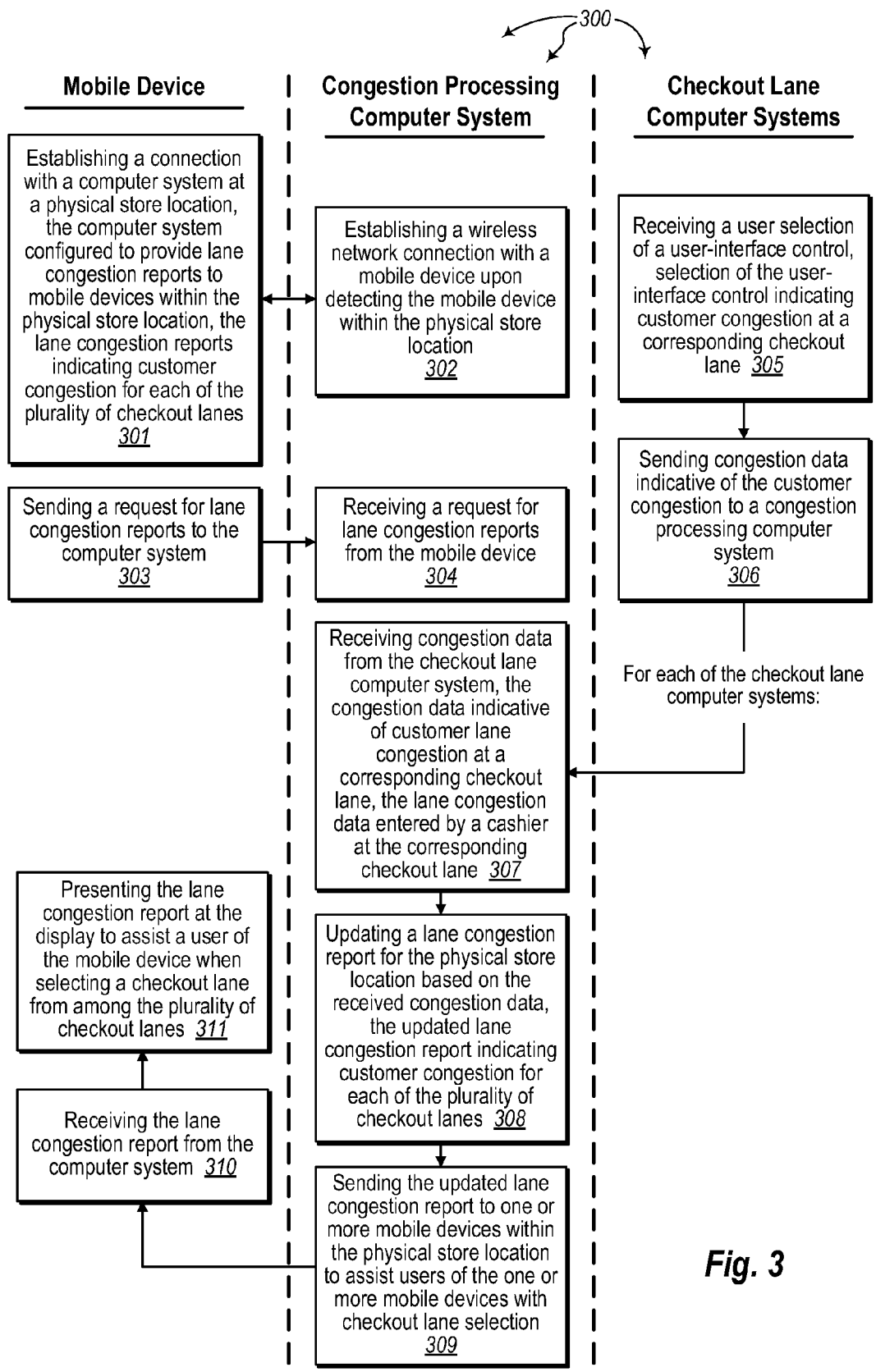
FIG. 3 illustrates a flow chart of an example method for helping customers select a checkout lane with relative low congestion within a physical store location.

FIG. 3 illustrates a flow chart of an example method 300 for helping customers select lesser congested checkout lanes within a physical store location. Method 300 will be described with respect to the components and data of computer architecture 200.

Method 300 includes establishing a connection with a computer system at a physical store location, the computer system configured to provide lane congestion reports to mobile devices within the physical store location, the lane congestion reports indicating customer congestion for each of the plurality of checkout lanes (301). Method 300 includes establishing a wireless network connection with a mobile device upon detecting the mobile device within the physical store location (302). For example, mobile device 201 and computer system 206 can establish a wireless connection through wireless communication 217. Similarly, mobile device 211 and computer system 206 can establish a wireless connection through wireless communication 218.

Method 300 includes sending a request for lane congestion reports to the computer system (303). Method 300 includes receiving a request for lane congestion reports from the mobile device (304). For example, mobile device 201 can send request 273 for congestion reports to computer system 206. Computer system 206 can receive request 273 form mobile device 201. Similarly, mobile device 211 can send request 274 for congestion reports to computer system 206. Computer system 206 can receive request 274 form mobile device 201. Wireless network module 207 can include mobile devices 201 and 211 in wireless device list 216.

Method 300 includes receiving a user selection of a user interface control, selection of the user interface control indicating customer congestion at a corresponding checkout lane (305). For example, capture module 236 can receive an indication that cashier 231 has adjusted a user-interface control indicating a first checkout lane congestion (e.g., in a range from 0 to 10) at a corresponding checkout lane. Similarly, capture module 246 can receive an indication that cashier 241 has adjusted a user-interface control indicating a second different checkout lane congestion (e.g., more or less than the first checkout lane congestion) at a corresponding checkout lane. Likewise, capture module 256 can receive an indication that cashier 241 has adjusted a user-interface control indicating a third different checkout lane congestion (e.g., more or less than the first and/or second checkout lane congestions) at a corresponding checkout lane. That is, each of cashiers 231, 241, and 251 can indicate a different congestion at their corresponding checkout lane depending, for example, on the number of customers at their checkout lane and/or the number of items customers at their checkout lane intended to purchase.

Capture modules 236, 246, and 256 can formulate the different congestions into corresponding congestion data 234, 244, and 254 respectively. Capture modules 236, 246, and 256 can also append lane IDs 233, 243, and 253 to congestion data 234, 244, and 254 respectively to identity checkout lanes where congestion data was captured.

Method 300 includes sending congestion data indicative of the customer congestion to a congestion processing computer system (306). For example, checkout lane computer 232 can send lane ID 233 along with congestion data 234 to congestion processor 208. Similarly, checkout lane computer 242 can send lane ID 243 along with congestion data 244 to congestion processor 208. Likewise, checkout lane computer 252 can send lane ID 253 along with congestion data 254 to congestion processor 208.

Method 300 includes, for each of the checkout lane computer systems, receiving congestion data from the checkout lane computer system, the congestion data indicative of customer congestion at a corresponding checkout lane, the congestion data entered by a cashier at the corresponding checkout lane (307). For example, congestion processor 208 can receive lane ID 233 along with congestion data 234, lane ID 243 along with congestion data 244, and lane ID 253 along with congestion data 254.

Method 300 includes updating a lane congestion report for the physical store location based on the received congestion data, the updated lane congestion report indicating customer congestion for each of the plurality of checkout lanes (308). For example, congestion processor can update lane congestion report 271 based congestion data 234, 234, and 254 and whether checkout lanes are open or closed. Updated lane congestion report 271 can indicate customer congestion at checkout lanes 233L, 243L, and 253L corresponding to checkout lane computers 232, 242, and 252. Customer congestion can be represented as a numeric number or may be "unknown". Updated lane congestion report 271 can also indicate that one or more other checkout lanes are closed. When updating lane congestion report 271, congestion processor 208 can refer to lane mappings 276 to map lane IDs to corresponding checkout lanes (233 to 233L, 243 to 243L, 253 to 253L). When updating a lane congestion report, congestion processor 208 can change the data format of congestion data 234, 244, and 254. For example, congestion processor 208 can convert a numerical indication of congestion (e.g., 5) to a more user friendly textual message (e.g., "moderate congestion"). Alternately, congestion data can remain in its original format.

Method 300 includes sending the updated congestion report to one or more mobile devices within the physical store location to assist users of the one or more mobile devices with checkout lane selection (309). For example, computer system 206 can send lane congestion report 271 to mobile devices 201 and 202. Method 300 includes receiving a congestion report from the computer system (310). For example, each of mobile devices 201 and 211 can receive congestion report 271.

Method 300 includes presenting the congestion report at the display to assist a user of the mobile device when selecting a checkout lane from among the plurality of checkout lanes (311). For example, a user-interface for store application 272A (an instance of store application 272) can present lane congestion report 271 at display 203. Similarly, a user-interface for store application 272B (an instance of store application 272) can present lane congestion report 271 at display 213. Lane congestion report 271 can indicate the congestion at each of checkout lanes 233L, 243L, and 253L and may also indicate one or more other checkout lanes that are closed.

In some embodiments, store application 272A and 272B change the data format of congestion data 234, 244, and 254. For example, store application 272A and 272B can convert a numerical indication of congestion (e.g., 2) to a message (e.g., "light congestion"). Alternately, congestion data can remain in its original format.

Accordingly, customers 202 and 212 are presented with information they can use to select a less congested checkout lane form among checkout lanes 233L, 243L, and 253L. After customers 202 and 212 have selected a checkout lane, lane congestion report 271 may indicate that lane congestion at checkout lanes 233L, 243L, and 253L is essentially the same as when the customer selected a checkout lane. Thus, customers 202 and 212 can feel more confident in their checkout lane selection. If congestion changes at one or more lanes, a lane congestion report can also assist customers 202 and 212 with switching checkout lanes.

Figure 4:
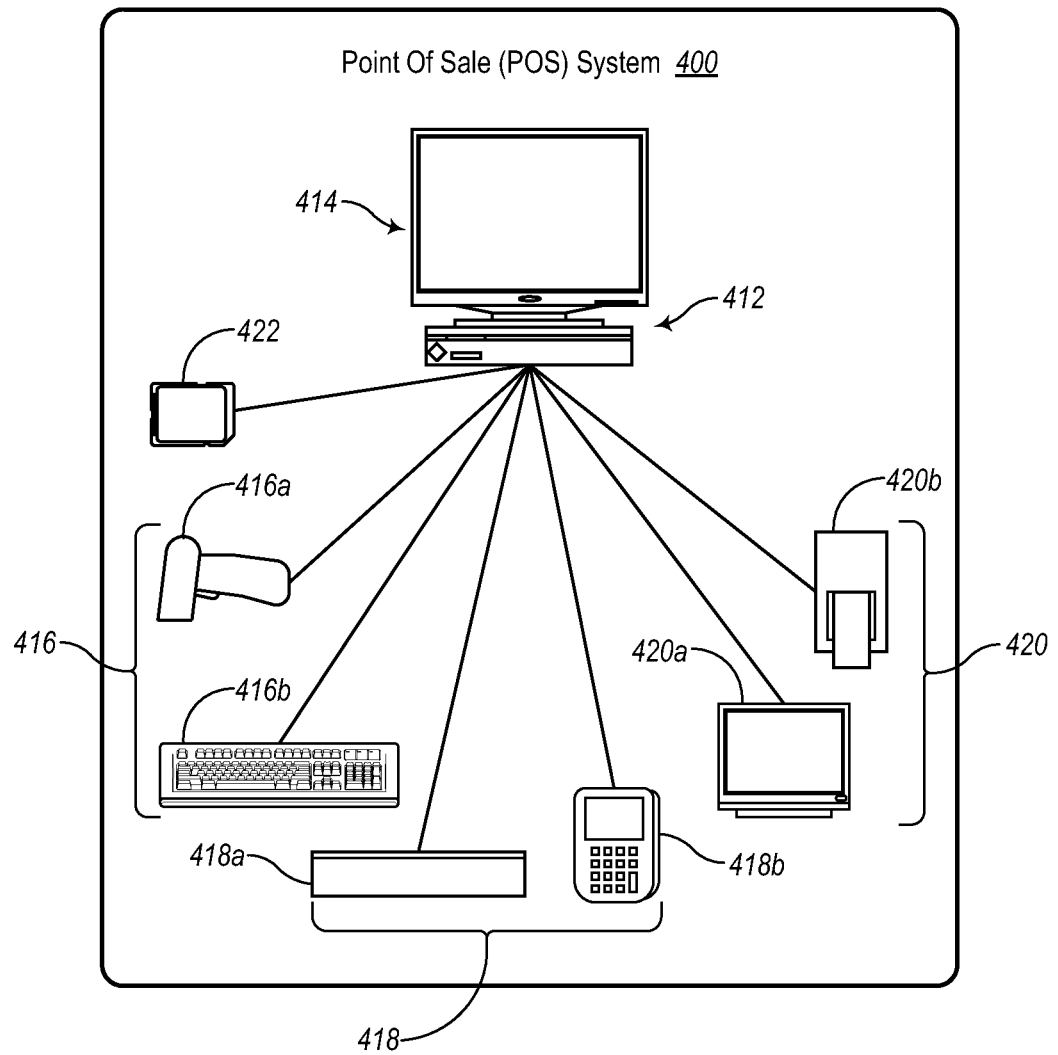
FIG. 4 illustrates an example schematic block diagram of a point-of-sale ("POS") system that can be used at a checkout lane.

FIG. 4 illustrates an example schematic block diagram of a point-of-sale ("POS") system 400. Any of checkout lane computers 232, 242, and 252 can be similar to POS system 400. In some embodiments, the hardware, software, or hardware and software of POS system 400 may be configured to implement one or more methods in accordance with the present invention. For example, POS system 400 may be manufactured, programmed, modified, or upgraded to support capturing and transferring congestion data for checkout lanes.

POS system 400 can include various components. In some embodiments, POS system 400 includes a central or primary computer 412, a monitor 414 (e.g., a cashier-facing monitor 414), one or more input devices 416 (e.g., scanners 416a, keyboards 416b, scales, or the like), one or more payment devices 418 (e.g., cash drawers 418a, card readers 418b) for receiving or returning payments, one or more output devices 420 (e.g., customer-facing display 420a or monitor 420a, receipt printer 420*b*), or the like or combinations or subcombinations thereof, and NFC module 422, such as, for example, an NFC dongle.

Computer 412 may form the backbone of POS system 410. Other components 416, 418, 420, 422 forming part of a POS system 410 can communicate with computer 412. Input devices 416 and certain payment devices 418 can feed data and commands to computer 412 for processing or implementation. For example, scanner 416*a* can pass data communicating the identity of one or more items to be purchased, returned, or the like to a computer 412. Similarly, card reader 418*b* can pass payment information to computer 412.

On the other hand, output devices 420 and certain payment devices 418 can follow or implement commands issued by computer 412. For example, cash drawer 418*a* may open in accordance with the commands of computer 412. Similarly, customer-facing display 420*a* and receipt printer 420*b* can display or output data or information as instructed by computer 412.

In some embodiments, computer 412 includes a module similar to capture modules 236, 246, and 256. The module can present a user-interface control for indicating checkout lane congestion on monitor 414. A cashier can adjust the user-interface control to indicate customer congestion in a checkout lane. The module can capture the indicated customer congestion and send the indicated customer congestion to another computer system for processing.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. At a computer system, the computer system communicatively coupled to a plurality of checkout lane computer systems, the plurality of checkout lane computer systems at a plurality of checkout lanes in a physical store location, each checkout lane computer system corresponding to a checkout lane at the physical store location, the computer system comprising a congestion processor and being in communication with a database, a method for determining checkout lane congestion for the physical store location, the method comprising:

for one or more of the plurality of checkout lane computer systems:

receiving, at the computer system, a lane identification and congestion data from the checkout lane computer system, the congestion data being a value indicative of customer congestion at a corresponding checkout lane, the congestion data entered by a cashier at the corresponding checkout lane;

updating, with the congestion processor of the computer system, a lane congestion report for the physical store location based on the congestion data received from the one or more checkout lane computer systems, the updated lane congestion report indicating customer congestion for each of the plurality of checkout lanes, and wherein the congestion processor is further configured to update the lane congestion report by referring to lane mappings stored in the database to identify the checkout lane from the received lane identification and to associate the identified checkout lane with corresponding congestion data in the lane congestion report;

receiving, with a wireless network module of the computer system, one or more requests for the updated lane congestion report from one or more mobile devices within the physical store location, the one or more mobile devices including a lane congestion viewer application for facilitating wireless communication with the wireless network module to send the request when the wireless network module determines that a wireless network connection has been established with the one or more mobile devices upon detecting the one or more mobile devices within the physical store location; and wirelessly transmitting, with the wireless network module of the computer system, the updated lane congestion report to the one or more mobile devices in response to receiving the one or more requests to trigger the lane congestion viewer application to present the updated lane congestion report at a display of the one or more mobile devices to assist users of the one or more mobile devices with checkout lane selection.

2. The method of claim 1, wherein receiving congestion data from the checkout lane computer system comprises receiving a numerical value, the numerical value entered in response to the cashier adjusting a user-interface control in communication with the checkout lane computer system.

3. The method of claim 2, further comprising converting the numerical value to a textual message representation of customer congestion at a checkout lane.

4. The method of claim 1, wherein updating the lane congestion report comprises changing an indicated customer congestion for at least one checkout lane, changing the indicated customer congestion including one of decreasing a previous customer congestion or increasing a previous customer congestion based on the received congestion data.

5. The method of claim 1, wherein wirelessly transmitting the updated lane congestion report to the one or more mobile devices comprises sending the updated lane congestion report to at least one mobile device in essentially real time.

6. The method of claim 1, further comprising for each of the one or more mobile devices:

establishing a wireless network connection with the mobile device; and including the mobile device in a wireless device list for devices that are to receive lane congestion reports.

7. The method of claim 1, wherein updating the lane congestion report with the congestion processor of the computer system occurs in essentially real-time.

* * * * *